UNITED STATES PATENT OFFICE.

ERNEST FOURNEAU, OF PARIS, FRANCE.

PROCESS OF OBTAINING ACIDYLIC DERIVATIVES OF ESTERS OF DIMETHYLAMINO-DIMETHYLOXYACETIC ACID.

952,323.  Specification of Letters Patent.  Patented Mar. 15, 1910.

No Drawing.  Application filed January 28, 1907. Serial No. 354,463.

*To all whom it may concern:*

Be it known that I, ERNEST FOURNEAU, a citizen of the French Republic, residing in Paris, in the Republic of France, have invented certain new and useful Improvements in Processes for Obtaining Acidylic Derivatives of Esters of Dimethylaminodimethyloxyacetic Acid, for which application has been made in France, February 1, 1906; Germany August 15, 1906.

The process is for obtaining acidylic derivatives of esters of dimethylaminodimethyloxyacetic acid. They are of the form

in which R is an acidyl group and $R_1$ is an alkyl group. The esters from which these derivatives are obtained, and which have the above formula with H substituted for R, are described in the applicant's co-pending case Serial No. 354,464, filed January 28th, 1907. These esters can all be as easily acidylized as the amino-alcohols of the U. S. Patent 828,846 and by the same methods. These acidylized derivatives are susceptible of variable industrial employment in therapeutics, as they possess the same general properties as the amino-alcohol esters described in U. S. Patent No. 829374 and these properties vary according to the acid which is used for the reaction. The benzoic ester of the body:—

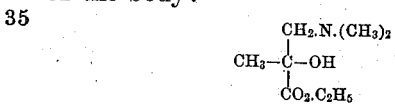

for example, possesses powerful anesthetic properties and a feeble toxicity.

In a general manner the salts are prepared best by mixing molecular weights of the amino-alcohol and of the chlorid of an acid dissolved respectively in anhydric benzene. The mixture, at first clear, is heated strongly for some minutes, when the chlorhydrate of the acidylic derivative precipitates, nearly always crystallized and pure.

Other general methods can be employed. For example—Boil the amino-alcohol with the benzoic or acetic anhydrid, or with any other anhydrid of an acid in the presence of benzene, agitate the base with a chlorid of acid and bicarbonate of soda or pyridin. It is important solely to avoid the action of strong alkalies which can saponify the ester group.

First example: Dimethylaminodimethylbenzoyloxyacetate of ethyl,

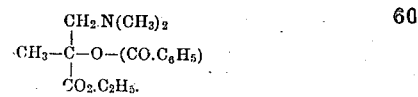

Mix cold the two solutions constituted as follows:—

First solution, 100 grams of the amino alcohol

dissolved in 200 grams of benzene.

Second solution, 100 grams of chlorid of benzoic acid dissolved in 200 grams of benzene.

A considerable rise of temperature ensues. The liquor is at first limpid, then during the next few hours it forms itself into a mass of crystals. Dry by centrifuging, wash several times with anhydrous ether and finally crystallize out in a mixture of alcohol and ether. The yield amounts to 95%. The product has the form of very fine needles, melting at 137 degrees centigrade, very soluble in alcohol and aceton. The substance possesses pronounced anesthetic properties. The free base or amino-ester of benzoic acid is liquid, syrupy and insoluble in water, and boils at 210° C. under 42 millimeters pressure and is obtained by treating the hydrochlorid of the ester with alkaline carbonate.

Second example: Dimethylaminodimethyl benzoyloxyacetate of methyl

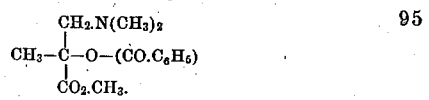

Boil the following mixture for about 5 hours in an apparatus provided with a reflux condenser:—

Dimethylaminodimethyloxyacetate of methyl 160 grams, benzoic anhydrid 250 grams, benzene 500 grams. Agitate in a weak solution of hydrochloric acid, (preferably 1 part fuming hydrochloric acid to 5 parts water). Any other inorganic acid of suitable concentration may be used for this purpose. All the benzolic base or amino-ester of benzoic acid passes into the acid solution. This last is evaporated *in vacuo* to a syrupy consistency. The residue is treated with dry carbonate of soda which sets the amino-ester of benzoic acid at liberty as well as the unaltered amino-alcohol which has not entered into the re-action. The mixture of the bases is extracted with ether. The ether solution is washed several times with water, to take out the small quantity of non-benzolized amino-alcohol, then it is dried over dry sulfate of soda. The ether solution is then treated with a concentrated alcoholic solution of gaseous hydrochloric acid, the chlorhydrate of the benzolic derivative being precipitated. The latter is washed with ether, centrifuged, and recrystallized in a mixture of absolute alcohol and of ether. It crystallizes in fine needles; its properties are identical with those of the ethyl derivative of Example No. 1. It melts at 149 to 150 degrees centigrade. The free base or amino-ester of benzoic acid is liquid, syrupy, insoluble in water, and boils at 220° C. under 75 millimeters pressure and is obtained by treating the chlorhydrate with alkaline carbonate.

Third example: Dimethylaminodimethyl-isovaleryloxyacetate of ethyl

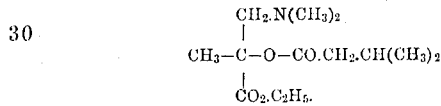

Mix 200 grams of the amino-alcohol as in Example 1, 500 grams of anhydrous benzene, 160 grams of chlorid of isovaleryl $C_4H_9CO.Cl$. Notable heating ensues. After several hours the chlorhydrate of the isovaleryl derivative is precipitated in the state of pretty spangles. Yield 220 grams. After recrystallization in a mixture of aceton and ether the substance has the form of needles grouped in spangles, melting at 132 degrees. The chlorhydrate is hygroscopic. The free base or amino-ester of isovaleric acid is liquid and boils at 138° C. under 17 millimeters pressure.

Fourth example: Dimethylaminodime-bromoisovaleryloxyacetate of ethyl

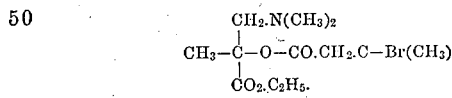

Mix 200 grams of base as in Example 1, 800 grams of benzene, 250 grams of chlorid of bromoisovaleryl $C_4H_8Br—COCl$. The re-action is very lively, but it does not separate out the chlorhydrate of bromoisovaleryl since it is fairly soluble in the benzene. After completely cooling, add 60 centimeters of ether. The liquid becomes troubled and at the end of some hours the chlorhydrate crystallizes out. This is centrifuged and washed in anhydrous ether and crystallized in a mixture of alcohol and ether. Brilliant non-hygroscopic needles very soluble in water and alcohol are obtained. The substance has a bitter and pungent taste. Its melting point is 134 to 135 degrees centigrade. The free base or amino-ester of bromoisovaleric acid is liquid and cannot be brought to boiling point nor distilled without decomposing.

The acidylic derivatives produced by the process which forms the subject of the present invention are used in various ways in medical science; they possess anesthetic properties, and can be largely used for producing local anesthesia, one of their principal advantages for this purpose being that they are only very slightly poisonous as compared with such anesthetic substances as cocaine, which have been most usually employed for this purpose up to the present time.

I declare that what I claim is:—

A process for obtaining the acidylic derivatives of the esters of dimethylaminodimethyloxyacetic acid, of the formula

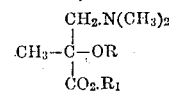

in which R = an acidyl group
R¹ = an alkyl "

consisting in mixing in the cold molecular weights of the esters of the amino-oxy-acids of the general formula

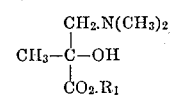

and a substance capable of replacing the hydrogen of the hydroxyl group of the said esters by an acidyl group dissolved separately in anhydrous benzene, heating, setting free the ester by adding a weak alkali, and isolating the resulting ester by extraction.

In witness whereof, I have hereunto signed my name this 14th day of January 1907, in the presence of two subscribing witnesses.

ERNEST FOURNEAU.

Witnesses:
 ANTONIN MONTEILHET,
 HANSON C. COXE.